United States Patent [19]

Nishizawa et al.

[11] Patent Number: 4,536,320
[45] Date of Patent: Aug. 20, 1985

[54] NEMATIC LIQUID CRYSTALLINE COMPOSITION

[75] Inventors: Tsutomu Nishizawa, Yokohama; Ryoichi Tukahara, Mobara; Ryoichi Morinaka; Tuneo Hidaka, both of Ohmuta, all of Japan

[73] Assignee: Mitsui Toatsu Chemicals, Inc., Tokyo, Japan

[21] Appl. No.: 538,823

[22] Filed: Oct. 5, 1983

Related U.S. Application Data

[63] Continuation-in-part of Ser. No. 223,015, Jan. 6, 1981, abandoned.

[30] Foreign Application Priority Data

Jan. 17, 1980 [JP] Japan ................. 80-3100[U]

[51] Int. Cl.$^3$ ................. C09K 3/34; G02F 1/13
[52] U.S. Cl. ................. 252/299.1; 350/349; 260/380
[58] Field of Search ................. 252/299.1; 350/349; 260/380

[56] References Cited

U.S. PATENT DOCUMENTS

| | | | |
|---|---|---|---|
| 3,792,970 | 2/1974 | Neeff | 8/39 |
| 3,960,751 | 6/1976 | Moriyama et al. | 252/299 |
| 4,154,746 | 5/1979 | Huffman | 260/378 |
| 4,232,950 | 11/1980 | Benham | 350/349 |
| 4,273,929 | 6/1981 | Boller et al. | 252/299.1 |
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard | 252/299.1 |
| 4,395,350 | 7/1983 | Boller et al. | 252/299.1 |

FOREIGN PATENT DOCUMENTS

| | | | |
|---|---|---|---|
| 26004 | 7/1980 | European Pat. Off. | 252/299.1 |
| 38460 | 10/1981 | European Pat. Off. | 252/299.1 |
| 3009940 | 9/1980 | Fed. Rep. of Germany | 252/299.1 |
| 3009974 | 9/1980 | Fed. Rep. of Germany | 252/299.1 |
| 2444702 | 7/1980 | France | 252/299.1 |
| 2011940 | 7/1979 | United Kingdom | 252/299.1 |
| 2024824 | 1/1980 | United Kingdom | 252/299.1 |
| 2037803 | 7/1980 | United Kingdom | 252/299.1 |
| 2069518 | 8/1981 | United Kingdom | 252/299.1 |
| 2086409 | 5/1982 | United Kingdom | 252/299.1 |

OTHER PUBLICATIONS

Cognard, J., et al., "Colorants Anthraquinoniques Stables des Parametre D'Ordre Eleve en Solution Dans les Cristaux Liquides", Mol. Cryst. Liq. Cryst., (1981), vol. I, pp. 1 to 9.

Saeva, Franklin D., "Liquid Crystal Display", Xerox Disclosure Journal, vol. 1, Nos. 9-10, (Sep.-Oct. 1976), pp. 61 and 62.

*Primary Examiner*—Teddy S. Gron
*Attorney, Agent, or Firm*—Fisher, Christen & Sabol

[57] ABSTRACT

A composition for a liquid crystal display containing at least one nematic liquid crystalline material having dissolved therein at least one anthraquinonic dye of the formula

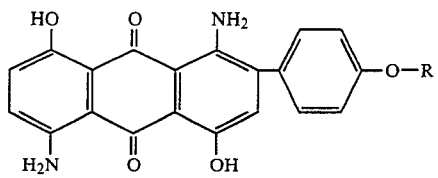

wherein R is a linear or branched $C_{7-15}$ alkyl group.

1 Claim, 2 Drawing Figures

NEMATIC LIQUID CRYSTALLINE COMPOSITION

This is a continuation-in-part application of Ser. No. 223,015 filed on Jan. 6, 1981, now abandoned.

BACKGROUND OF THE INVENTION

This invention relates to a nematic liquid crystalline composition, and particularly, to a composition for liquid crystalline color display utilizing an electro-optical effect which comprises nematic liquid crystals and a dichroic dye dissolved therein.

BROAD DESCRIPTION OF THE INVENTION

More specifically, this invention relates to a nematic liquid crystalline composition used in a display device utilizing the electro-optical effect of nematic liquid crystals, which comprises at least one nematic liquid crystalline material and dissolved therein at least one anthraquinonic dye of the formula

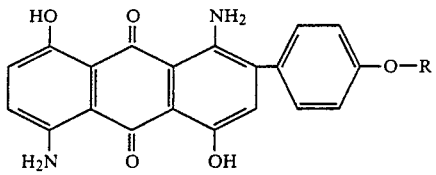

(I)

wherein R represents a linear or branched alkyl group having 7 to 15 carbon atoms.

Liquid crystal display devices containing dichroic dyes have already been known as "guest-host" mode display devices in the field of liquid crystal technology, and are utilized as display devices in watches, portable electronics calculators, televisions, etc.

This type of display device is based on the theory that the orientation of dichroic dye molecules follows that of molecules of a liquid crystalline material. Specifically, upon the application of an external stimulation which is normally an electric field, liquid crystal molecules change from an "off" state to an "on" state and become oriented, and incident to this, dichroic dye molecules are simultaneously oriented. Consequently, the degrees of light absorption by the dye molecules in the two states change to achieve color display.

Such an electro-optical effect means a liquid crystal color display utilizing the so-called guest-host effect. The guest-host mode is presently operated by a method which involves the use of nematic liquid crystals having positive or negative dielectric anisotropy and a method which involves the use of liquid crystals that show phase transition from a cholesteric phase to a nematic phase upon the application of an electric field. The present invention can be applied to any of these operating methods.

Some dichroic dyes which operate in accordance with this theory have been known heretofore, but none of them have proved to be entirely satisfactory in their performance in commercial applications. This has partly hampered the development and commercialization of liquid crystal color display devices based on this theory.

Generally, dichroic dyes used in liquid crystal color display devices based on this theory must meet certain basic requirements. For example, they are required to have sufficient coloring ability in small amounts, a high dichroic ratio that enables them to show a high contrast by application of voltage and absence of voltage, sufficient solubility in liquid crystals, excellent durability and high stability. Moreover, they should not reduce the performance of the devices even when used for a long period of time.

While display devices of the present type have previously been used mainly indoors, attempts have been made in recent years to use them outdoors as well. In outdoor use, the dyes will be decomposed by ultraviolet light or heat of sunlight, and the resulting decomposition products may cause an increase in power consumption. Or the dyes which should be dissolved in liquid crystals will precipitate as crystals and lose their inherent displaying function when exposed to low temperatures outdoors. Accordingly, the dyes should be selected by giving a sufficient consideration to these problems.

Investigations of the present inventors have led to the discovery that among a series of dyes represented by general formula (I')

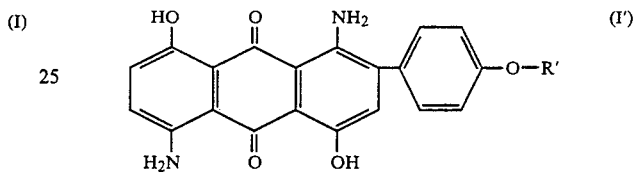

(I')

wherein R' represents any alkyl group, those in which R' is a linear or branched alkyl group having 7 to 15 carbon atoms can meet the aforesaid requirements.

As shown in Table 1, dyes of the above formula in which R' is an alkyl group having not more than 6 carbon atoms, especially not more than 4 carbon atoms, show a solubility in liquid crystals of about one percent by weight at the highest even at relatively high temperatures of 25° C., and of course show a much lower solubility in liquid crystals at lower temperatures. In order to obtain stable display elements from which no dye is precipitated even when they are exposed to low temperatures of not more than 25° C., the concentration of the dye should be adjusted to not more than 0.9–0.5 percent by weight. However, at such low dye concentrations, any color obtained is not sufficient for display, and can achieve only very unsatisfactory displaying. In order to obtain satisfactory displays, the dyes should have a solubility in liquid crystals of at least 2 percent by weight at 25° C.

Dyes of the above formula in which R' is an alkyl group having at least 16 carbon atoms are advantageous over dyes of the above formula in which the alkyl group has not more than 15 carbon atoms in regard to solubility in liquid crystals. But since the coefficients of molecular absorbance of the dyes are almost constant, they must be used in higher concentrations with an increase in the number of carbon atoms in the alkyl group (or in molecular weight) in order to obtain a specified color density.

To obtain a higher dichroic ratio, the alkyl group represented by R' is preferably linear, while to obtain a higher solubility in liquid crystals, it is preferably branched.

Table 1 below shows the relation of the alkyl group R' of the dye of formula (I') to the dichroic ratio and the solubility in liquid crystals. In Table 1, the dichroic ratio of each dye is measured at 25° C. in a glass cell with a gap of 10 μm after 0.3 to 1 percent by weight of each dye is dissolved in biphenyl-type liquid crystals (tradename E-8) made by Merck Co. and subjected to homogeneous orienting treatment. The solubility is measured in liquid crystals E-8 at 25° C.

TABLE 1

| R' | λmax | Dichroic ratio | Solubility |
|---|---|---|---|
| —CH$_3$ | 638$^{nm}$ | 6.4 | <0.5% |
| —C$_2$H$_5$ | 638 | 6.4 | <0.5 |
| —C$_4$H$_9$(n) | 642 | 6.7 | 1.0 |
| —C$_7$H$_{15}$(n) | 643 | 7.4 | 2.5 |
| —C$_8$H$_{17}$(n) | 643 | 7.9 | 2.0 |
| —C$_9$H$_{19}$(n) | 643 | 7.3 | 3.0 |
| —C$_2$H$_4$CH(CH$_3$)CH$_2$C(CH$_3$)$_3$ | 640 | 7.0 | 7.0 |

The anthraquinonic dyes of formula (I) can be synthesized, for example, by a method which comprises reacting 1,5-dihydroxy-4,8-diamino-anthraquinone-2,6-disulfonic acid (called Alizarin Saphirol B) with a compound of the formula

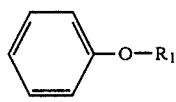 (II)

wherein R$_1$ represents a linear or branched alkyl group having 7 to 15 carbon atoms, in sulfuric acid in the presence of boric acid, saponifying the borate ester group, and thereafter desulfonating the product; or by a method which comprises reacting the quinoneimine of 1,5-diamino-4,8-dihydroxyanthraquinone with the compound of formula (II). A compound of formula (I) can also be prepared by reacting 2-(4'-hydroxyphenyl)-anthraquinone derivative obtained by the aforesaid synthesizing methods using a compound of formula (II) in which R$_1$ is hydrogen, with an alkyl halide of the formula R$_2$—Hal  (III)

wherein R$_2$ represents a linear or branched alkyl group having 7 to 15 carbon atoms and Hal represents a halogen atom, in the presence or absence of a basic catalyst; or by a method which comprises reacting the aforesaid anthraquinone derivative with a tosyl ester of the formula R$_2$—O—Ts  (IV)

wherein R$_2$ represents the same groups as R$_2$ in formula (III), and Ts represents a tosyl group, in the presence or absence of a basic catalyst.

Since the crude dyes obtained by the above methods frequently contain inorganic salts and other impurities, they have to be purified by extraction or recrystallization using organic solvents, preferably by thin-layer chromatography or column chromatography.

The anthraquinonic dyes (I) in accordance with this invention color liquid crystals to a favorable brilliant blue color not attainable by conventional dichroic dyes, and have a very high dichroic ratio (contrast) and excellent fastness to light. Typical examples of the anthraquinonic dyes of formula (I) are shown in Table 2 below.

TABLE 2

| Dye No. | Structural formula | Color hue in liquid crystals (E-8 made by Merck & Co.) |
|---|---|---|
| 1 | —O—(CH$_2$)$_6$CH$_3$ | Blue |
| 2 | —O—(CH$_2$)$_7$CH$_3$ | Blue |
| 3 | —O—CH$_2$—C(CH$_3$)$_2$—CH$_2$—CH(CH$_3$)$_2$ | Blue |
| 4 | —O—(CH$_2$)$_8$CH$_3$ | Blue |

TABLE 2-continued

| Dye No. | Structural formula | Color hue in liquid crystals (E-8 made by Merck & Co.) |
|---|---|---|
| 5 | HO, O, NH$_2$ anthraquinone with phenyl-O-CH(CH$_2$CH$_2$CH$_3$)$_2$; H$_2$N, O, OH | Blue |
| 6 | HO, O, NH$_2$ anthraquinone with phenyl-O-(CH$_2$)$_2$-CH(CH$_3$)-CH$_2$-C(CH$_3$)$_3$; H$_2$N, O, OH | Blue |
| 7 | HO, O, NH$_2$ anthraquinone with phenyl-O-(CH$_2$)$_{14}$CH$_3$; H$_2$N, O, OH | Blue |

BRIEF DESCRIPTION OF THE DRAWINGS

The invention is further described below with reference to the accompanying drawings in which.

DETAILED DESCRIPTION OF THE INVENTION

Figure 1:
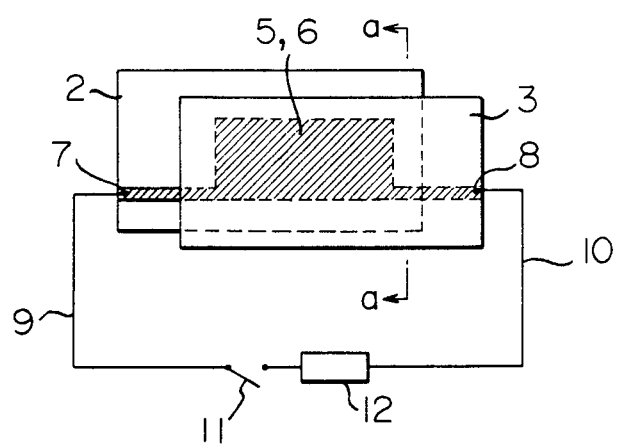
FIG. 1 is a front elevational view of a liquid crystal display device including the composition of this invention.

Referring to the drawings, a nematic liquid crystalline substance colored with a dye is filled in layer 1 interposed between two parallel-laid glass slides 2 and 3. Glass slides 2 and 3 are spaced from each other by spacers 4 defining both side ends of layer 1. Slides 2 and 3 respectively have on their inner surfaces transparent electrodes 5 and 6. Electrode 5 is connected to external lead wire 9 through contact 7. Likewise, electrode 6 is connected to an exterior lead wire 10 through contact 8. Electrodes 5 and 6 are of rectangular shape and are disposed face-to-fact to each other. Voltage source 12 and switch 11 connected thereto in series are connected between exterior lead wires 9 and 10. Voltage source 12 supplies a dc voltage or an ac voltage of low frequency sufficient to re-orient the liquid crystal molecules and dichroic dye molecules in layer 1 and align them on the inner surfaces of slides 2 and 3. Usually, voltages of 3 to 20 volts are sufficient.

An example of the nematic liquid crystal used in this invention is a mixture composed of 43 percent of 4-cyano-4'-n-pentyl biphenyl, 17 percent of 4-cyano-4'-n-propoxy biphenyl, 13 percent of 4-cyano-4'-n-pentoxy biphenyl, 17 percent of 4-cyano-4'-n-octoxy biphenyl, and 10 percent of 4-cyano-4'-n-pentyl terphenyl. There can also be used a so-called chiral nematic liquid crystal mixture obtained by adding 5% of cholesteryl nonanoate, 3% of optically active 4-cyano-4'-isopentyl biphenyl, etc. to the aforesaid mixture. This nematic liquid crystal mixture is in the cholesteric phase in the absence of electric voltage, but phase transition to the nematic phase occurs upon the application of voltage.

In addition to the above example, biphenyl-type liquid crystals, phenyl cyclohexane-type liquid crystals, Schiff base-type liquid crystals, ester-type liquid crystals, pyrimidine-type liquid crystals, tetrazine-type liquid crystals, and other nematic liquid crystals exhibiting positive or negative dielectric anisotropy can be used as the nematic liquid crystals in this invention either singly or as mixtures.

The dichroic dyes in accordance with this invention are used either singly or as mixtures. The concentration of the dichroic dye in the liquid crystalline substance is such that the dye dissolves in the liquid crystals and the dye molecules can be fully oriented and aligned by the orientation of the liquid crystal molecules. Generally, the suitable concentration of the dye is 0.01 to 20 percent by weight, preferably 0.01 to 3 percent by weight, based on the liquid crystalline substance. It is also possible to obtain the desired color hue by mixing the dichroic dye in accordance with this invention with another dichroic or non-dichroic dye or colorant.

In the making of such a liquid crystal display device, transparent electrodes are treated in advance so that the liquid crystal molecules and the dichroic dye molecules may be oriented parallel or perpendicular to the surfaces of the transparent electrodes. The treatment can be performed, for example, by a method comprising simply rubbing the surfaces of the transparent electrodes with a cotton cloth, etc. in a fixed direction, a method comprising coating a silane-type compound, a method comprising vapor deposition of silicon oxide, etc., or a method comprising coating a silane-type compound or depositing a vapor of silicon oxide, and then rubbing the surfaces of the transparent electrodes with a cotton cloth, etc. in a fixed direction.

When a solution consisting of nematic liquid crystals having positive dielectric anisotropy and the dichroic dye in accordance with this invention is filled in a liquid crystal color display device which has been treated so that the liquid crystals and dye molecules may be oriented parallel to the surfaces of transparent electrodes, the display device is of the type wherein the blue color of the electrode portions disappears upon the application of voltage.

When a solution consisting of nematic liquid crystals having negative dielectric anisotropy and the dichroic dye in accordance with this invention is filled in a liquid color display device which has been treated so that the liquid crystal and dye molecules may be oriented perpendicular to the surfaces of transparent electrodes, the display device is of the type wherein the electrode portions are colored to blue upon the application of voltage.

Figure 2:
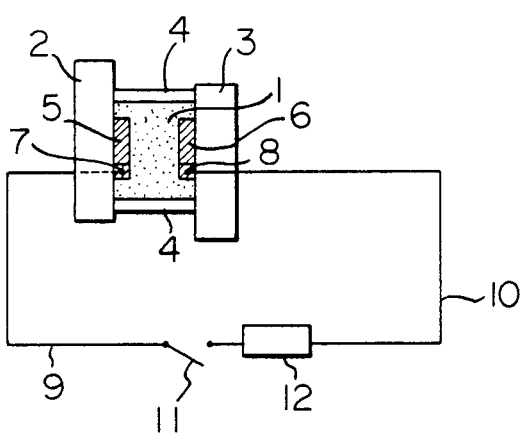
FIG. 2 is a cross-sectional view taken along line a—a of FIG. 1.

The display devices shown in FIGS. 1 and 2 are of the type which permits viewing of transmitted light. These devices may become reflective-type display devices if glass slide 2 is replaced by a non-transparent reflecting plate, or by placing a reflective plate rearwardly of slide 2 to permit viewing from ahead of glass slide 3.

There are a diversity of liquid crystals and methods available in constructing liquid crystal color display devices using the dichroic dyes in accordance with this invention. Essentially, all of them can be classified as displaying methods based on a guest-host mode utilizing the electro-optical effect of nematic liquid crystals.

The following typical Examples illustrate the present invention specifically. The invention, however, is not limited to these Examples. All percentages in these Examples are by weight.

EXAMPLE 1

Boric acid (16 g) and 50 g of Alizarin Saphirol B were added to 500 g of 95% sulfuric acid, and the mixture was stirred at 50° C. for 2 hours. To the mixture was added 15 g of n-heptoxybenzene at 10° C., and the mixture was stirred for 2 hours. Water (500 ml) was added, and the mixture was stirred at 90° C. for 2 hours. The precipitate was filtered, and the filtration cake was dispersed in 1 liter of water. The dispersion was made alkaline by adding a 45% aqueous solution of sodium hydroxide dropwise. Then, 20 g of sodium hydrosulfite was added to the solution at 80° C., and reacted for 1 hour. After cooling, the reaction mixture was filtered, washed with water, and dried to afford 36 g of a crude product corresponding to dye No. 1 in Table 2. Recrystallization from ethanol afforded a compound corresponding to dye No. 1 as dark blue crystals (m.p. 190°–192° C., CR 7.4 in E-8). The product was a blue dye which showed a maximum absorption at a wavelength of 586 m$\mu$ and 626 m$\mu$ in its toluene solution.

In a display device of the type shown in FIGS. 1 and 2, Silicone KF-99 (a trademark of Shinetsu Chemical Co., Ltd. for a silicone compound) was coated on the surfaces of transparent electrodes 5 and 6. Layer 1 of this display element was filled with a colored liquid crystal solution composed of 0.1 part by weight of dye No. 3 prepared as above and 9.9 parts by weight of a liquid crystal mixture composed of 38% of 4-cyano-4'-n-penyl biphenyl, 8% of 4-cyano-4'-n-pentoxy biphenyl, 23% of 4-cyano-4'-n-heptyl biphenyl, 8% of 4-cyano-4'-heptoxy biphenyl, 10% of 4-cyano-4'-n-octoxy biphenyl, 10% of 4-cyano-4'-n-pentyl terphenyl and 3% of optically active 4-cyano-4'-isopentyl biphenyl. A plastic film having a thickness of 10 $\mu$m was used as spacer 4.

When switch 11 was opened, this display device was seen to be colored to brilliant blue. When switch 11 was closed and an ac voltage of 10 V at 32 Hz was applied, that portion of the device at which transparent electrodes 5 and 6 faced each other became colorless. When switch 11 was opened, it again showed a blue colored state. When the above display device was placed in the light path of a spectrophotometer, the maximum absorption wavelength was 643 m$\mu$. When switch 11 was opened and closed at this wavelength, the ratio of absorbance was 1:4 showing good dichroism.

When this display device was subjected to irradiation of visible light having a wavelength of more than 400 m$\mu$ for a long period of time, no change was noted in color hue, the ratio of absorbance, etc., and the display device retained the same properties as it had immediately after construction.

EXAMPLE 2

By repeating the procedure of Example 1 except that 21 g of n-octoxybenzene was used instead of 15 g of n-heptoxybenzene, 33 g of a crude product corresponding to dye No. 2 in Table 2 was obtained. The crude product was dissolved in chloroform, and chromatographed on a column of silica gel powder (Wako Gel C-300, a trademark of Wako Jyunyaku Co., Ltd.) using chloroform as a developing solvent. The main eluates containing the desired product were evaporated to dryness under reduced pressure, and the residue was recrystallized from benzene to afford a compound corresponding to dye No. 2 as acicular needles having blue violet gloss (m.p. 183°–184° C., C.R. 7.9 in E-8). The product was a blue dye which showed a maximum absorption at a wavelength of 583 m$\mu$ and 625 m$\mu$ in its toluene solution.

In a display device of the type shown in FIGS. 1 and 2, the surfaces of transparent electrodes 5 and 6 were subjected to horizontal aligning treatment in a known manner. Layer 1 of the display device was filled with a colored liquid crystalline mixture composed of 0.2 part by weight of the dye No. 2 obtained and purified as above and 9.8 parts by weight of a liquid crystal mixture (ZLI-1132, a trademark for a phenylcyclohexane-type liquid crystal mixture made by Merck & Co.). A plastic film having a thickness of 10 m$\mu$ was used as spacer 4.

When switch 11 was opened, this display device was seen to be colored to brilliant blue. When switch 11 was closed and an ac voltage of 6 V at 32 Hz was applied, that portion of the device at which the transparent electrodes 5 and 6 faced each other became colorless. When switch 11 was opened, it again showed a blue colored state. When the above display device was placed in the light path of a spectrophotometer, the maximum absorption wavelength was 640 m$\mu$. When switch 11 was opened and closed at this wavelength, the ratio of absorbance was 1:4 showing good dichroism.

When this display device was subjected to irradiation of visible light having a wavelength of more than 400 m$\mu$ for a long period of time, no change was noted in color hue, the ratio of absorbance, etc., and the display device retained the same properties as it had immediately after construction.

EXAMPLE 3

A compound corresponding to dye No. 6 in Table 2 was prepared by performing the same reaction and purification as in Example 1 except that 30 g of 3,5,5-trimethylhexyl phenylether was used instead of 15 g of n-heptoxybenzene in Example 1 (m.p. 142°–143° C., C.R. 7.0 in E-8).

Using the compound corresponding to dye No. 6 prepared as above, the same liquid crystalline composition and display device as in Example 1 were made, and the same measurement as in Example 1 was performed. It was found that the maximum absorption wavelength of the liquid crystal display device was 640 mμ. When the switch 11 of device was opened and closed, the ratio of absorbance at this wavelength was 1:3.8.

We claim:
1. Nematic liquid crystalline composition comprising (i) at least one nematic liquid crystalline material, and (ii) dissolved in (i), the anthraquinonic dye compound of the formula:

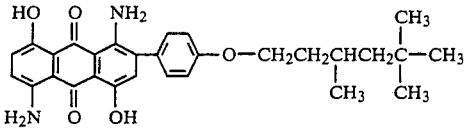

* * * * *